(12) United States Patent
Jin (10) Patent No.: US 8,499,026 B2
(45) Date of Patent: Jul. 30, 2013

(54) DISTRIBUTED PACKET PROCESSING SYSTEM FOR HIGH-SPEED NETWORKS AND DISTRIBUTED PACKET PROCESSING METHOD USING THEREOF

(75) Inventor: Yong Sig Jin, Gunpo-si (KR)

(73) Assignee: Wins Technet Co., Ltd., Seongnam-si (KR)

( * ) Notice: Subject to any disclaimer, the term of this patent is extended or adjusted under 35 U.S.C. 154(b) by 424 days.

(21) Appl. No.: 13/017,097

(22) Filed: Jan. 31, 2011

(65) Prior Publication Data

US 2011/0191403 A1 Aug. 4, 2011

(30) Foreign Application Priority Data

Feb. 2, 2010 (KR) .......................... 10-2010-0009551

(51) Int. Cl.
*G06F 15/16* (2006.01)
*H04L 12/18* (2006.01)
*H04L 12/56* (2012.12)

(52) U.S. Cl.
USPC ............................. 709/201; 370/389; 370/412

(58) Field of Classification Search
USPC ........................................................ 709/201
See application file for complete search history.

(56) References Cited

U.S. PATENT DOCUMENTS

| | | | |
|---|---|---|---|
| 2003/0196081 A1* | 10/2003 | Savarda et al. | 713/153 |
| 2004/0205532 A1* | 10/2004 | Lindner | 715/507 |
| 2008/0049774 A1* | 2/2008 | Swenson et al. | 370/412 |
| 2010/0054256 A1* | 3/2010 | Parker | 370/395.1 |

* cited by examiner

*Primary Examiner* — Wing F Chan
*Assistant Examiner* — David X Yi
(74) *Attorney, Agent, or Firm* — Patent Office of Dr. Chung S. Park (57) ABSTRACT

The present invention relates to a distributed packet processing system for high-speed networks and a distributed packet processing method using thereof, in which a FIFO-type packet processing engine having three packet processing steps is provided in plurality to process packet data in parallel in processing packets for high-speed networks, and, therefore, packet sequences are guaranteed, and packets can be further promptly process.

3 Claims, 12 Drawing Sheets

DISTRIBUTED PACKET PROCESSING SYSTEM FOR HIGH-SPEED NETWORKS AND DISTRIBUTED PACKET PROCESSING METHOD USING THEREOF

CROSS-REFERENCE TO RELATED APPLICATION

This application claims priority to and the benefit of Korean Patent Application No. 10-2010-0009551 filed in the Korean Intellectual Property Office on Feb. 2, 2010, the entire contents of which are incorporated herein by reference.

BACKGROUND OF THE INVENTION

1. Field of the Invention

The present invention relates to a packet processing system, and more specifically, to a distributed packet processing system for high-speed networks and a distributed packet processing method using thereof, in which a FIFO-type packet processing engine having three packet processing steps (packet read/packet analysis engine/packet write) is provided in plurality to process packet data in parallel in processing packets for high-speed networks, and, therefore, packet sequences are guaranteed, and packets can be further promptly process.

2. Background of the Related Art

Generally, a client terminal is connected to a server through a network, and if the client terminal transmits a data request signal to the server, the server transmits a variety of information data to the client terminal, and the transmitted information data is displayed on a GUI screen of the client terminal.

As the communication environments are improved recently, data transmitted and received through networks are increased in a large scale, and a further variety of data is transmitted.

Security mechanisms against viruses, hacking attacks and the like are provided accordingly, and a typical example of the security mechanisms is a firewall. Such a firewall examines whether or not a packet is normal and the packet contains virus information or hacking data, and only the data classified as safe is transmitted to the server.

However, a firewall in a recent environment of sending and receiving large amounts of data should process network data at a high-speed. Particularly, the network data should be guaranteed to pass through the firewall so that users can use the data more safely in a high-speed network environment.

Figure 12:
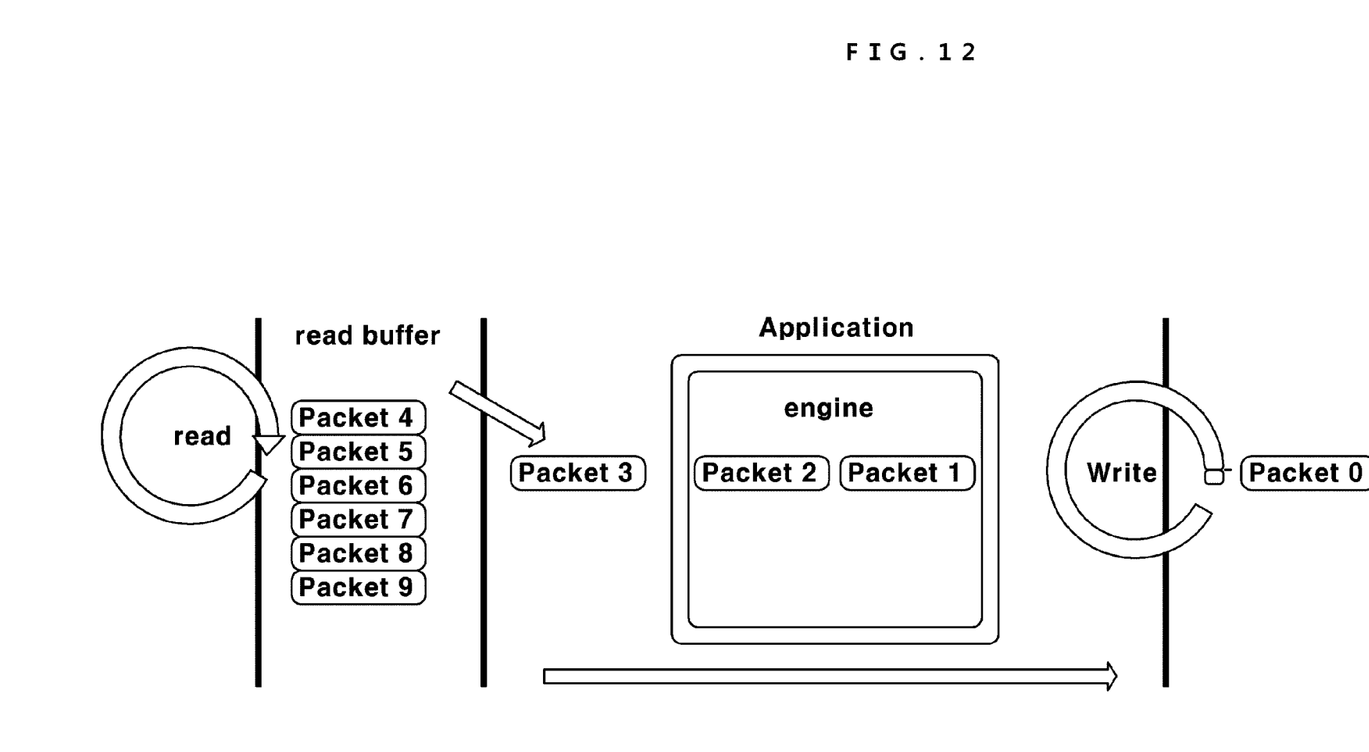
FIG. 12 is a view schematically showing the flow of packet processing according to a conventional technique.

Therefore, in processing packet data for networks, it is general that a FIFO-type packet processing structure of a high-speed network comprises the steps of receiving data, buffering the data, processing the data, and outputting the data, as shown in FIG. 12, and these steps should be performed in order. That is, as shown in FIG. 12, although a number of packet data are received, if processing the packet data is considerably delayed in a processing engine, the overall packet processing time will be extended.

Accordingly, if data processing in a certain packet processing step is delayed for an extended period of time, the time required for processing all high-speed network data will be extended, and it is inconvenient to use the network.

Therefore, packet processing techniques suitable for high-speed networks are required.

SUMMARY OF THE INVENTION

Therefore, the present invention has been made in view of the above problems, and it is an object of the present invention to provide a distributed packet processing system for high-speed networks, in which a FIFO-type packet processing engine having three packet processing steps (packet read/packet analysis engine/packet write) is provided in plurality to process packet data in parallel in processing packets for high-speed networks, and, therefore, packet sequences are guaranteed, and packets can be further promptly process.

Another object of the present invention is to provide a distributed packet processing method for high-speed networks, in which since a distributed packet read sequence serial number is assigned to each input packet data, the packet data can be processed in parallel by a plurality of engines, and the distributed packet data can be assembled and outputted based on the distributed packet read sequence serial numbers, and, therefore, the packet data are not damaged in the process of distributing and processing the packet data.

Particularly, since packet data can be processed in parallel when a packet processing step performed by one of a plurality of packet processing engines consumes a large packet processing time, the overall packet processing time is reduced.

To accomplish the above object, according to one aspect of the present invention, there is provided a distributed packet processing system for high-speed networks, wherein a server 11 is connected to a client terminal 13 through a network 12, and the distributed packet processing system 20 is connected between the network 12 and the server 11, the distributed packet processing system 20 comprising: a read port 22 for receiving input data; a write port 23 for outputting output data; a read buffer 24 connected to the read port 22, for buffering the input data; a write buffer 25 connected to the write port 23, for buffering the output data; a distributed packet application engine unit 30 for processing the input data, wherein since a plurality of engines is provided for each of multiple processing steps, packet data are distributed and processed in the plurality of engines of each step; a distributed packet serial engine unit 40 for assigning a distributed packet read sequence serial number to the input data; a distributed packet processing controller 21 for controlling the read buffer 24, the write buffer 25, the distributed packet application engine unit 30, and the distributed packet serial engine unit 40; and a database 26 for storing the input data, the output data, and serial information data on the distributed packet read sequence serial number.

The distributed packet application engine unit 30 comprises any one or more of: a plurality of decoding engines 31 for decoding the input data; a plurality of protocol invalid check engines 32 for determining whether or not a protocol of the input data is normal; a plurality of TCP processing engines 33 for processing TCP of the input packet data; a plurality of pattern processing engines 34 for determining whether or not a TCP protocol packet has an abnormal pattern; and a plurality of session processing engines 35 for processing a session for a normal TCP packet.

The distributed packet serial engine unit 40 sequentially assigns a distributed packet read sequence serial number to the input data, compares the distributed packet read sequence serial number of the packet data (with those of the other packet data) under the control of the distributed packet processing controller 21 while the distributed packet application engine unit 30 processes the packet data, and transmits data assembled in order by comparing the distributed packet read sequence serial numbers of the packets on which packet processing is completed by the distributed packet application engine unit 30, to the distributed packet processing controller 21.

The distributed packet processing controller 21 comprises: a read data signal processing unit 211 for receiving and processing the input data; a write data signal processing unit 212 for processing the output data; a serial data signal processing unit 213 for processing data transmitted and received to and from the distributed packet serial engine unit 40; an AP engine data signal processing unit 214 for processing data transmitted and received to and from the distributed packet application engine unit 30 in order to process packets; and a distributed packet main controller 210 for controlling the read data signal processing unit 211, the write data signal processing unit 212, the serial data signal processing unit 213, and the AP engine data signal processing unit 214, and the database 26 comprises: an input data storage unit 261 for storing the input data; an output data storage unit 262 for storing the output data; a serial data storage unit 263 for storing data information on the distributed packet read sequence serial number assigned to the packet data by the distributed packet serial engine unit 40; and an application data storage unit 264 for storing temporary packet data while the distributed packet application engine unit 30 processes the packets.

In addition, there is provided a distributed packet processing method using a distributed packet processing system for high-speed networks, wherein a server 11 is connected to a client terminal 13 through a network 12, and the distributed packet processing system 20 is connected between the network 12 and the server 11, the method comprising: a data input step S01 for buffering input data received through a read port 22 in a read buffer 24 and storing the buffered input data into a database 26; a sequence serial number assigning step S02 for reading and transmitting the input data stored in the database 26 to a distributed packet serial engine unit 40, assigning a distributed packet read sequence serial number to an input data packet in order of input by the distributed packet serial engine unit 40, and storing the packet data assigned with the distributed packet read sequence serial number in the database 26; a distributed packet processing step S03 for reading and transmitting the packet data stored in the database 26 and assigned with the distributed packet read sequence serial number to a distributed packet application engine unit 30, and storing packet data distributed to a plurality of engines in order of the distributed packet read sequence serial number and processed in parallel by the engines into the database 26; and a data output step S04 for reading the packet data stored in the database 26 and processed by the distributed packet application engine unit 30, assembling the packet data by the distributed packet serial engine unit 40 in order of packet based on sequence data information of the distributed packet read sequence serial number, and outputting output data through a write buffer 25 and a write port 23.

The distributed packet processing step S03 comprises: a packet data reading step S031 for reading and transmitting the packet data stored in the database 26 and assigned with the distributed packet read sequence serial number to the distributed packet application engine unit 30; a packet data sequential distribution step S032 for distributing the packet data to the plurality of engines depending on the sequence of the distributed packet read sequence serial number; a distributed multiple packet processing step S033 for individually processing corresponding packet data distributed to the plurality of engines, by each of the engines; a packet data sequence assembly step S034 for sorting the packet data in order of the distributed packet read sequence serial number after the packet data are distributed and individually processed by the plurality of engines; and a post-processing packet data storing step S035 for assembling the packet data in order and storing the assembled packet data in the database 26 after the packet data are distributed and processed by the plurality of engines.

Furthermore, there is provided a distributed packet processing method using a distributed packet processing system for high-speed networks provided between a server 11 and a client terminal 13, the method comprising: a data input step S01 for receiving, buffering, and storing packet input data; a sequence serial number assigning step S02 for reading the packet data stored in the database 26, assigning a distributed packet read sequence serial number to the packet data in order of packet, and storing the packet data assigned with the distributed packet read sequence serial number in the database 26; a distributed packet processing step S03 for reading the packet data stored in the database 26 and assigned with the distributed packet read sequence serial number, distributing the packet data to a plurality of engines, processing the packet data in parallel, and storing the processed packet data in the database 26; and a data output step S04 for reading the packet data processed and stored in the database 26, assembling the packet data in order of packet based on a sequence of the distributed packet read sequence serial number, and outputting the assembled packet data, and the distributed packet processing step S03 comprises: a packet data reading step S031 for reading the packet data stored in the database 26 and assigned with the distributed packet read sequence serial number; a packet data sequential distribution step S032 for distributing the packet data to the plurality of engines depending on the sequence of the distributed packet read sequence serial number; a distributed multiple packet processing step S033 for processing the packet data distributed to the plurality of engines; a packet data sequence assembly step S034 for assembling the packet data in order of the distributed packet read sequence serial number after the packet data are distributed to the plurality of engines and processed by individual engines; and a post-processing packet data storing step S035 for storing the packet data after the packet data are distributed and processed in parallel by the plurality of engines.

DETAILED DESCRIPTION OF THE PREFERRED EMBODIMENT

The preferred embodiments of the invention will be hereafter described in detail, with reference to the accompanying drawings.

Describing the configuration of a distributed packet processing system 20 for high-speed networks, as shown in FIGS. 1 to 11, a client terminal 13 is connected to a server 11 through a network 12, and the distributed packet processing system 20 for high-speed networks 10 is connected between the network 12 and the server 11, thereby constructing a distributed packet processing system 20 for high-speed networks for performing a packet processing method using the distributed packet processing system.

The distributed packet processing system 20 for high-speed networks 10 provided as described above performs packet processing on the data transmitted between the server 11 and the client terminal 13. Particularly, it is to effectively process a large amount of data when the capacity of the network increases greatly.

To this end, in the distributed packet processing system 20, a plurality of engines provided in each of multiple packet processing steps respectively processes packet data in parallel.

Accordingly, compared with conventional packet processing techniques sequentially processing packets in order of input, processing time is reduced.

The specific flow of the distributed packet processing method for high-speed networks according to the present invention will be described below.

First, a data input step S01 is performed. Input data received through a read port 22 is buffered in a read buffer 24 and stored in a database 26.

A plurality of processing steps can be added and performed in the data input step, if needed.

Then, a sequence serial number assigning step S02 is performed. The input data stored in the database 26 is read and transmitted to a distributed packet serial engine unit 40, and the distributed packet serial engine unit 40 assigns a distributed packet read sequence serial number to the input data packet in order of input. Then, the packet data assigned with the distributed packet read sequence serial number is stored in the database 26.

Accordingly, since the received input data is distinguished by the assigned distributed packet read sequence serial number, although packets are processed in a distributed manner, original data is not damaged by the association of the distributed packet read sequence serial numbers.

After the distributed packet read sequence serial number is assigned to the input packet data, a distributed packet processing step S03 is performed. The packet data stored in the database 26 and assigned with the distributed packet read sequence serial number is read and transmitted to a distributed packet application engine unit 30, and packet data distributed to each of engines in order of the distributed packet read sequence serial number and processed in parallel are stored in the database 26.

Figure 1:
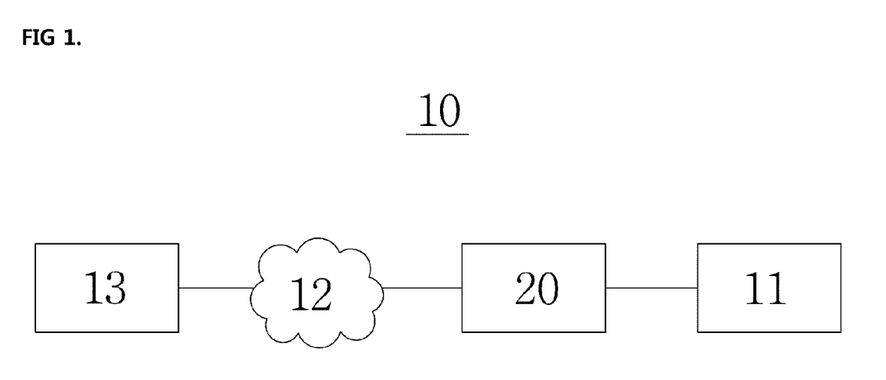
FIG. 1 is a view schematically showing the configuration of a high-speed network according to the present invention.
Figure 2:
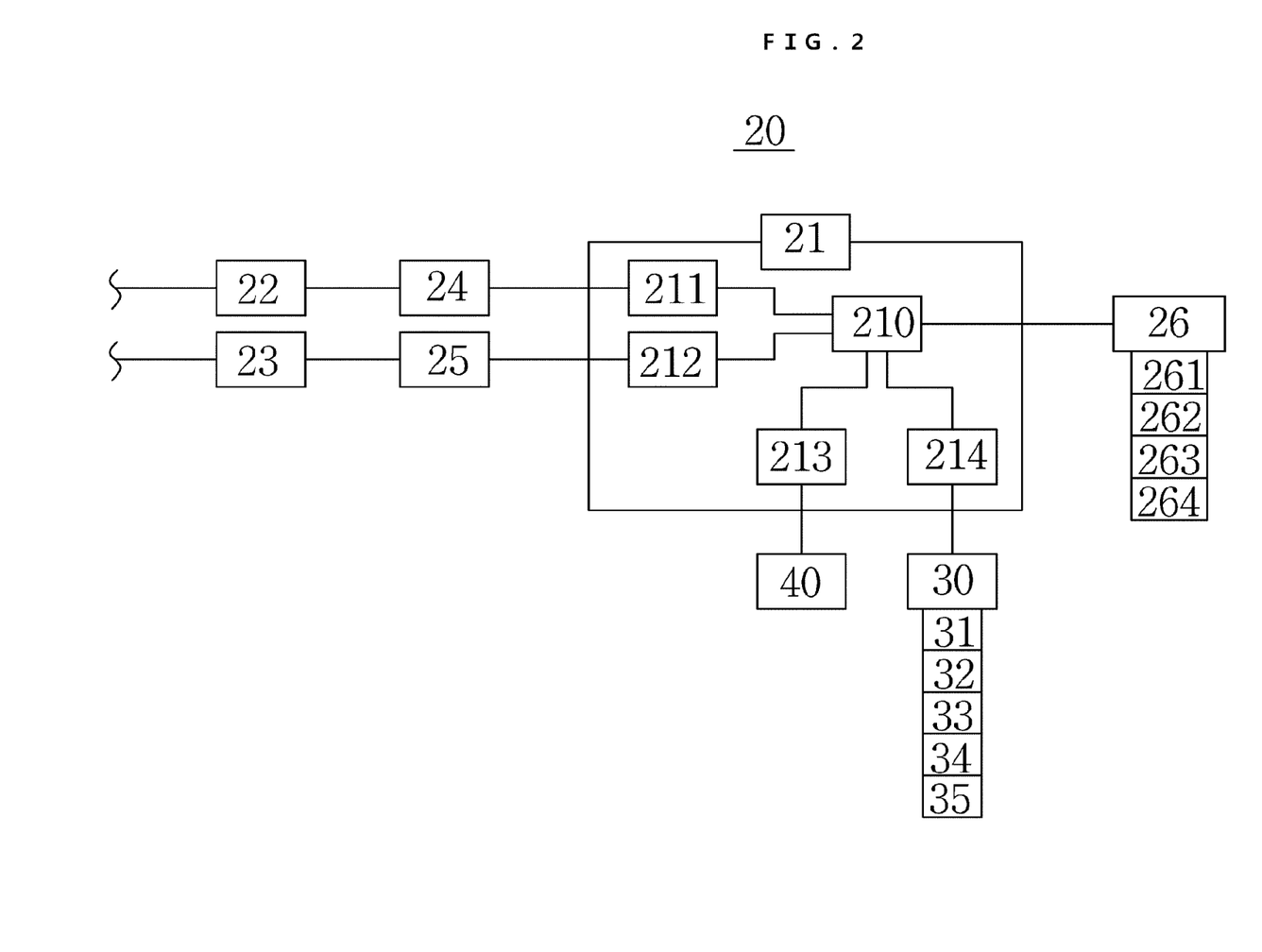
FIG. 2 is a view conceptually showing the configuration of a distributed packet processing system for high-speed networks according to the present invention.
Figure 3:
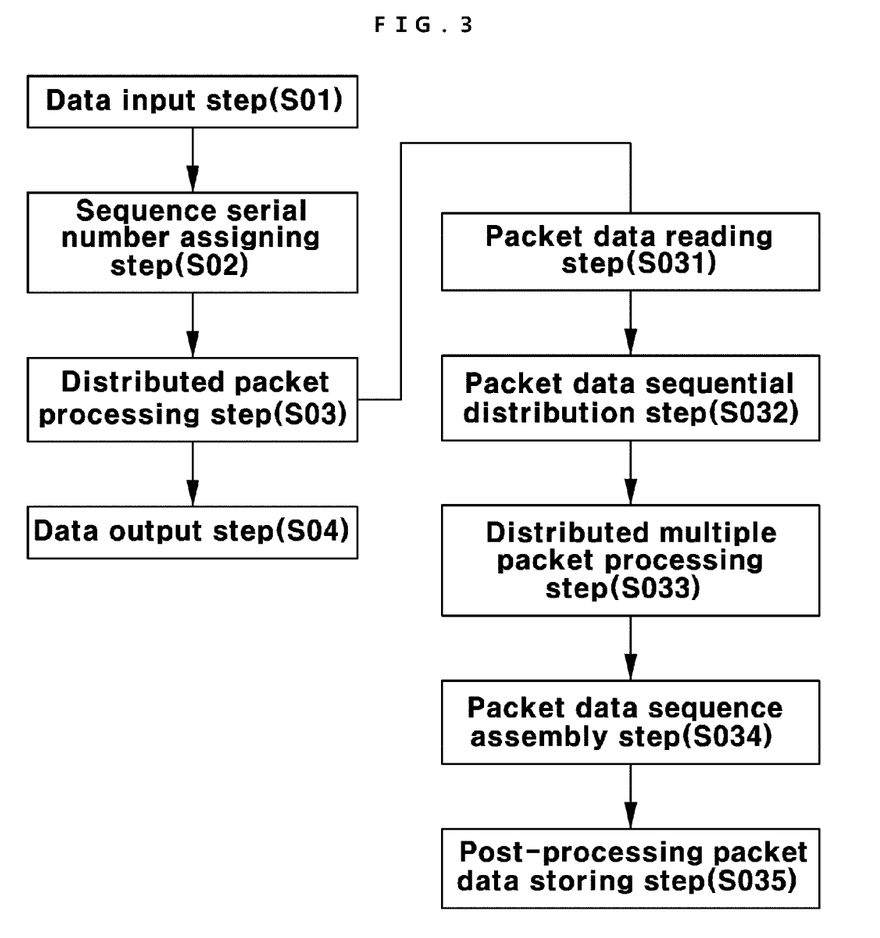
FIG. 3 is a flowchart illustrating a distributed packet processing method using the distributed packet processing system for high-speed networks according to the present invention.
Figure 4:
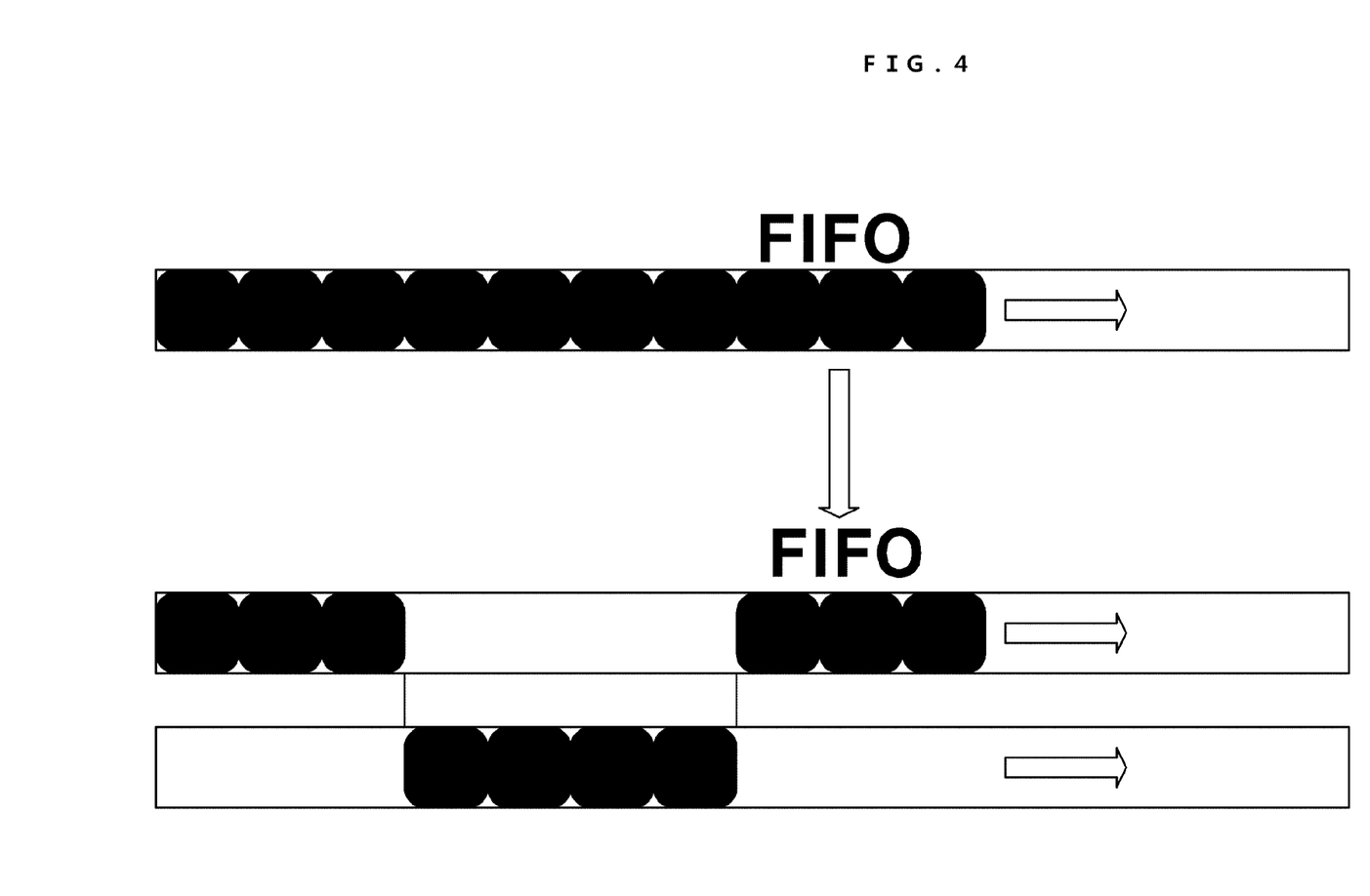
FIG. 4 is a view conceptually showing an example of the distributed packet processing system for high-speed networks according to the present invention.
Figure 5:
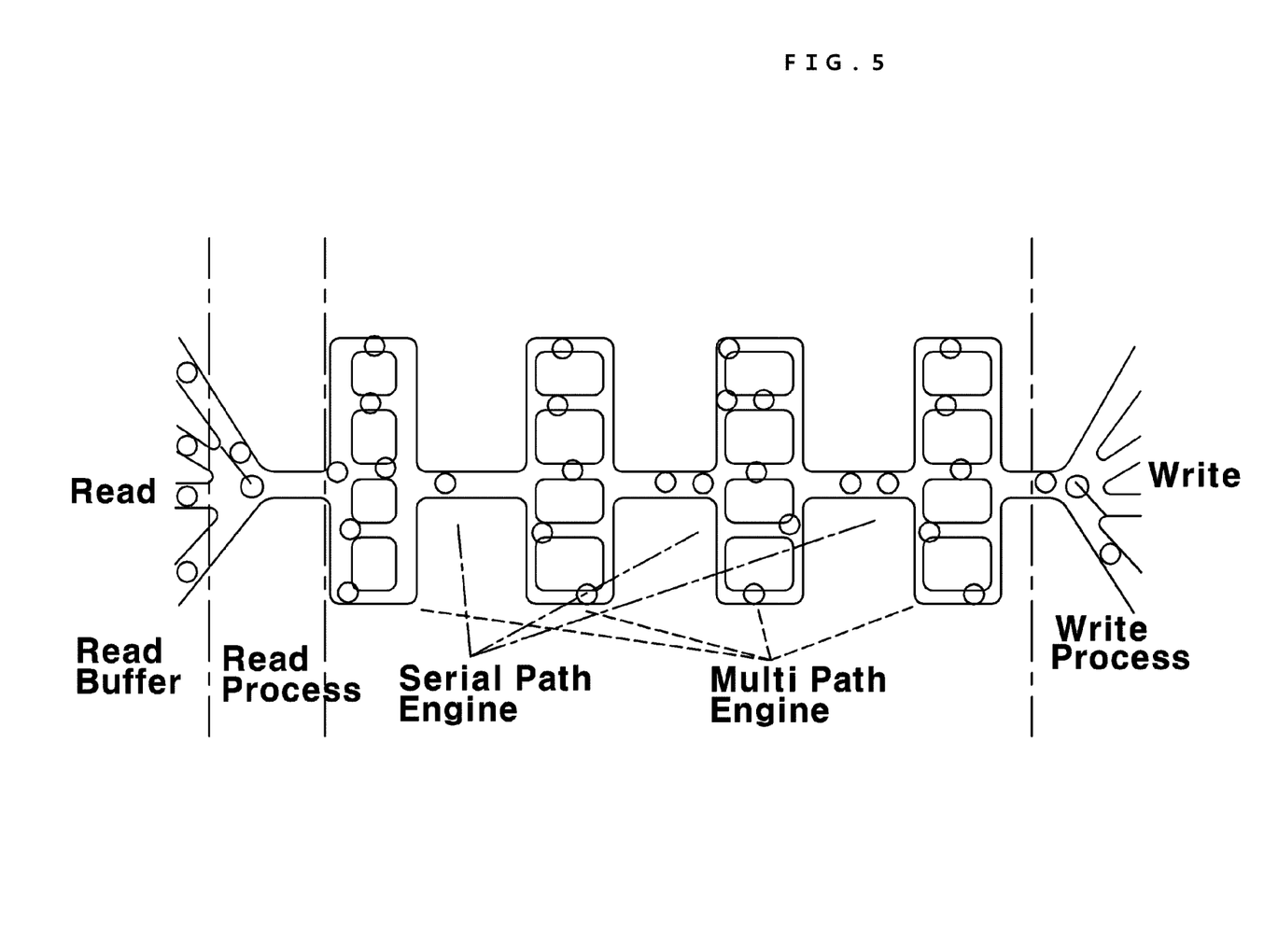
FIG. 5 is an example schematically showing the processing flow of the distributed packet processing system for high-speed networks according to the present invention.
Figure 6:
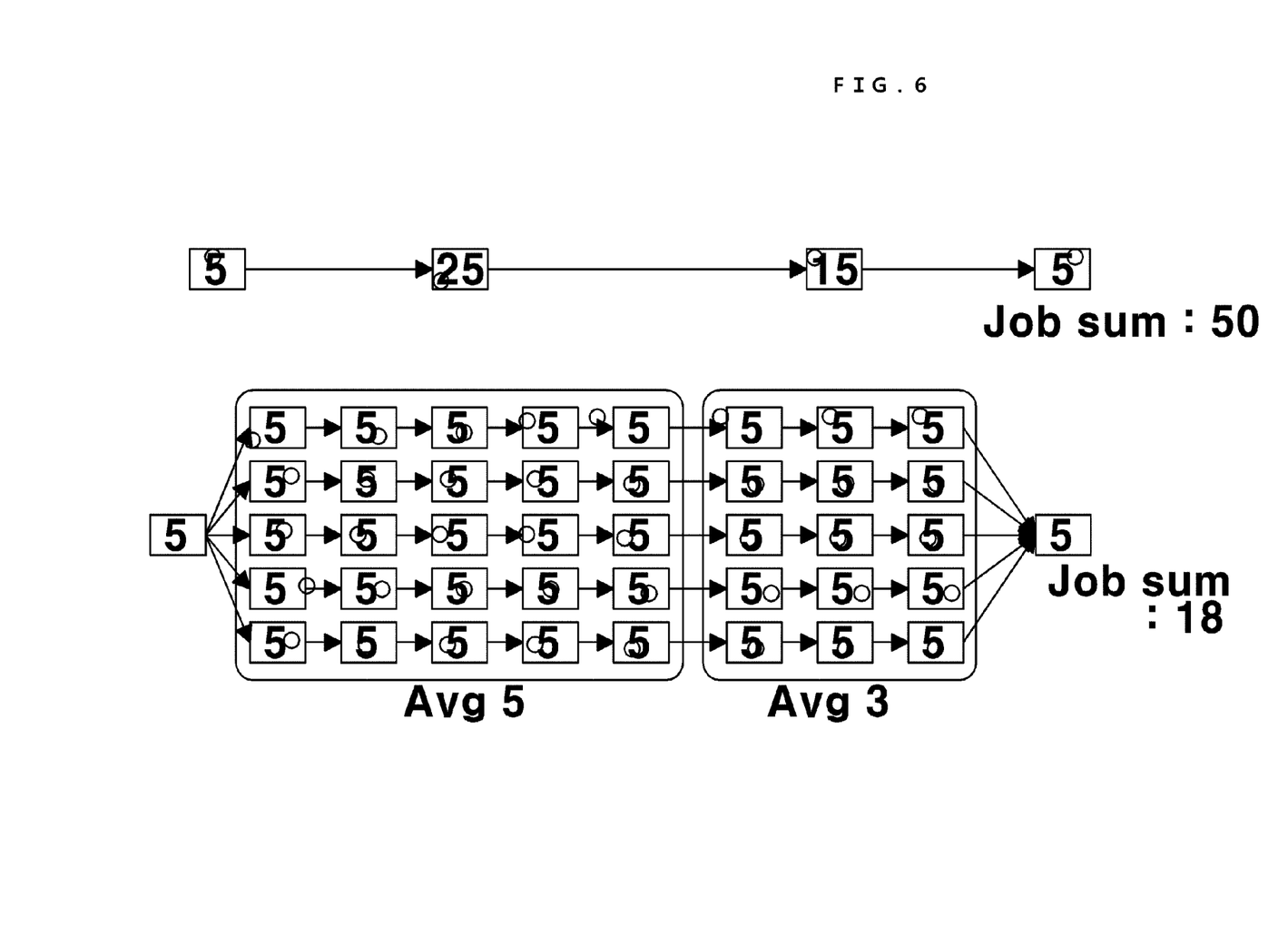
FIG. 6 is a mimetic view schematically showing the distributed packet processing system for high-speed networks according to the present invention.

That is, a conventional method is disadvantageous in that packets are sequentially processed as shown in FIG. 12 in order of input as shown in FIG. 4 and the time required for processing a large amount of packet data is considerably extended.

However, as shown at the lower part of FIG. 4, the overall packet processing time is reduced as much as the packet data are distributed, by distributing and processing a plurality of input packet data.

That is, since a plurality of packet processing engines is provided in a packet processing procedure comprising multiple processing steps, packets are distributed and processed in parallel as shown in FIGS. 5 to 9, and thus packet processing time is reduced.

Accordingly, the distributed packet serial engine unit 40 sequentially assigns a distributed packet read sequence serial number to each input data, compares the distributed packet read sequence serial number of the packet data (with those of the other packet data) under the control of the distributed packet processing controller 21 while the distributed packet application engine unit 30 processes the packet data, and transmits data assembled in order by comparing the distributed packet read sequence serial numbers of packets on which packet processing is completed by the distributed packet application engine unit 30, to the distributed packet processing controller 21.

As an example of a plurality of engines provided for the procedure of packet processing, the distributed packet application engine unit 30 comprises a reading member for receiving data through the read port and processing the input data, and a plurality of decoding engines 31 for decoding the input data.

A plurality of protocol invalid check engines 32 for determining whether or not a protocol of input data is normal and a plurality of TCP processing engines 33 for processing TCP of the input packet data can be provided.

In addition, engine members, such as a plurality of pattern processing engines 34 for determining whether or not a TCP protocol packet has an abnormal pattern and a plurality of session processing engines 35 for processing a session for a normal TCP packet, can be provided.

In addition, a plurality of engines, such as a UDP processing engine, can be further added or a portion of the engines can be reinforced in order to process packets appropriately to a network environment.

Figure 8:
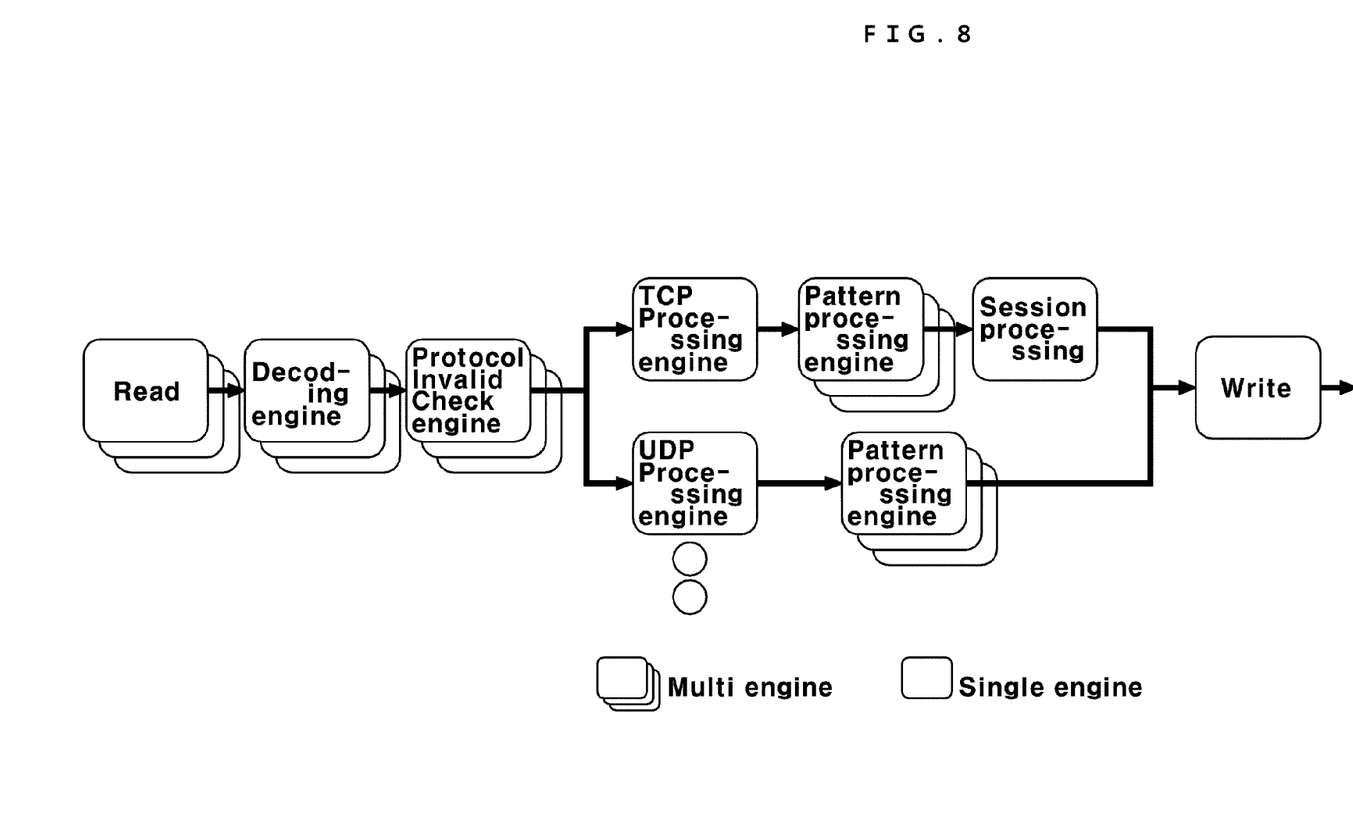
FIGS. 8 and 9 are views respectively showing a processing example of the distributed packet processing system for high-speed networks according to the present invention.
Figure 9:
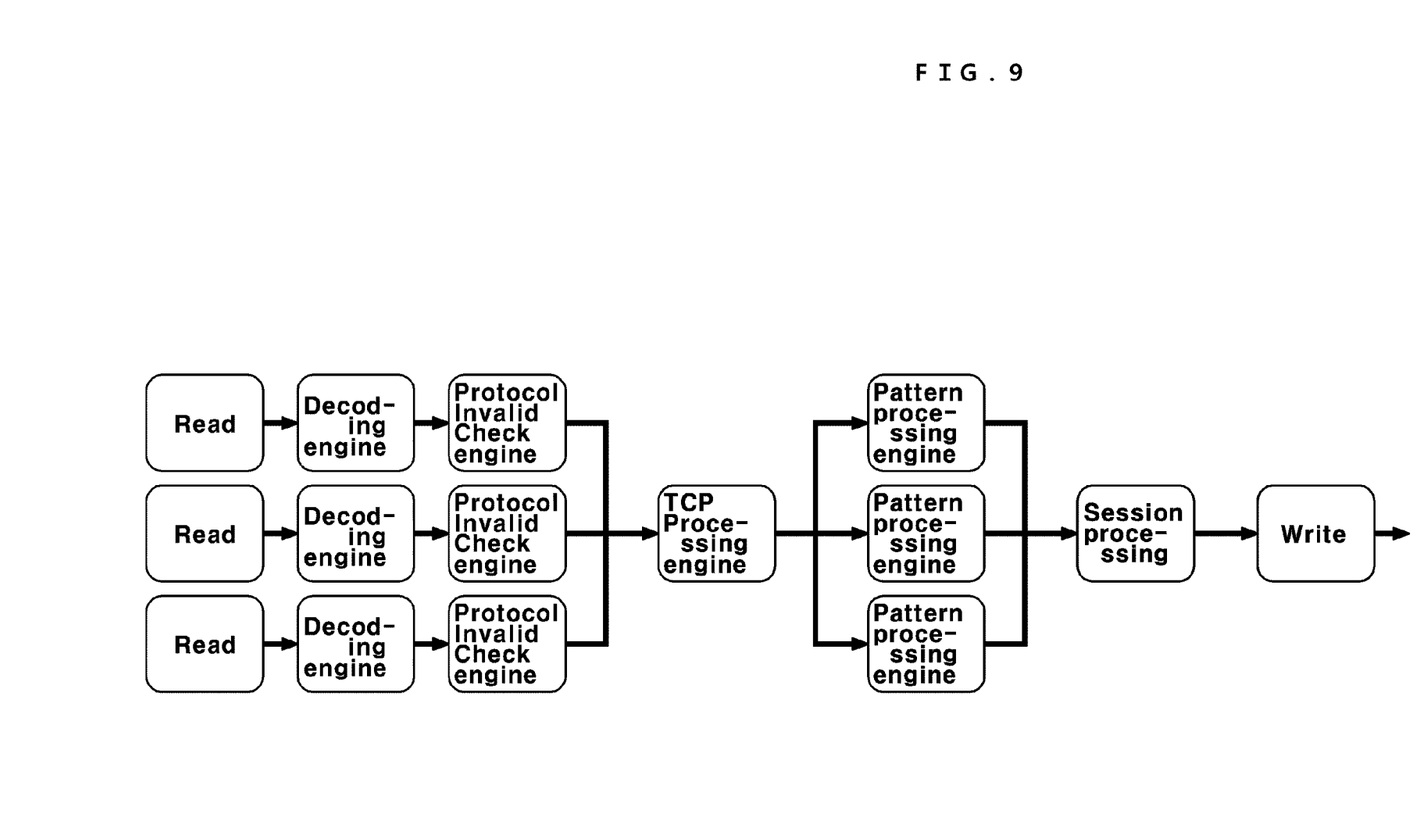
Figure 10:
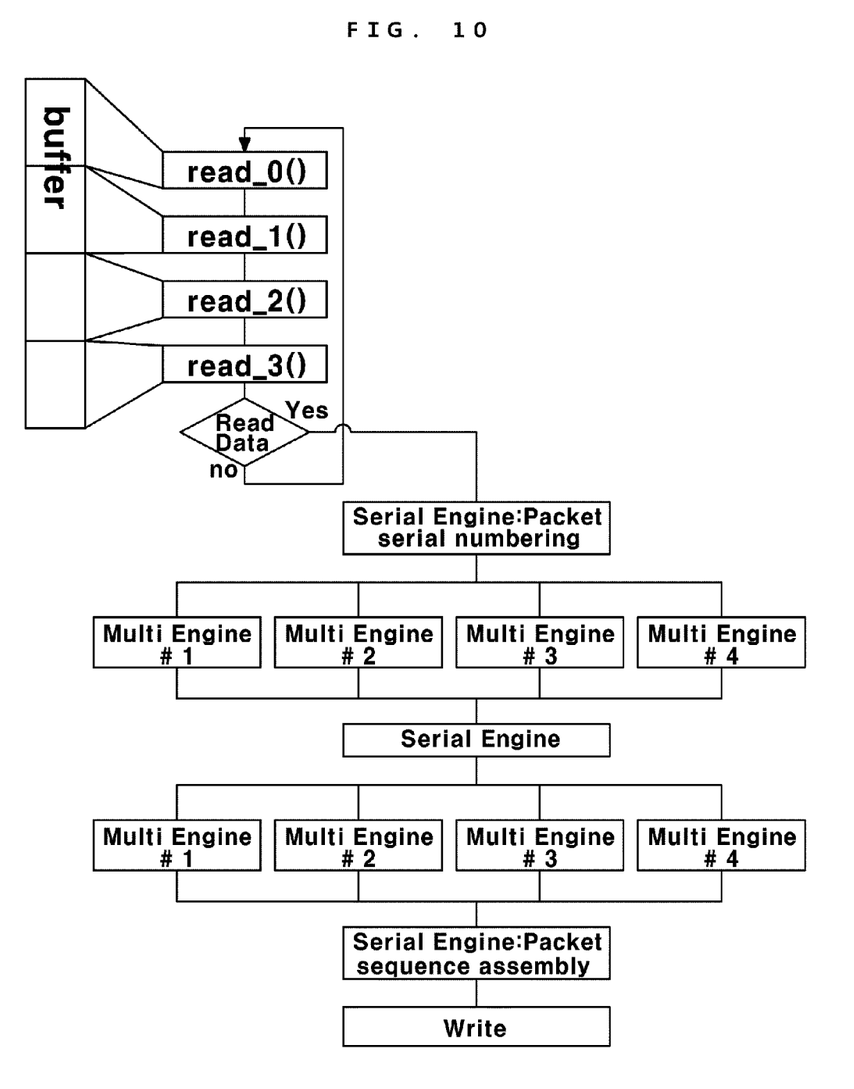
FIG. 10 is a flowchart illustrating the distributed packet processing method using the distributed packet processing system for high-speed networks according to the present invention.
Figure 11:
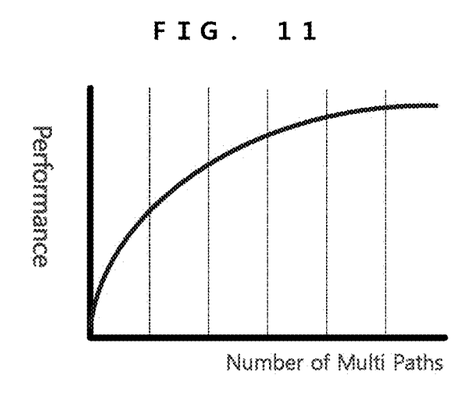
FIG. 11 is a graph illustrating the effect of the distributed packet processing method using the distributed packet processing system for high-speed networks according to the present invention.

Describing an embodiment of the distributed packet processing step S03 performed when a plurality of engines are provided, a packet data reading step S031 may be performed as shown in the examples of FIGS. 8 and 9. Packet data read through the read port, stored in the database 26 and assigned with a distributed packet read sequence serial number are read and transmitted to the distributed packet application engine unit 30.

Next, a packet data sequential distribution step S032 can be performed. The packet data are distributed to the plurality of engines depending on the sequence of the distributed packet read sequence serial number. These packets can be distributed to be appropriate to the system configuration, processing specifications and the like of the embodiment.

Thereafter, a distributed multiple packet processing step S033 can be performed. The packet data are distributed to a plurality of engines, and each of the engines individually processes corresponding packet data.

Describing the types of engines used in the embodiment shown in the accompanying drawings as an example, a decoding engine, a protocol invalid check engine, a TCP processing engine, a UDP processing engine, a pattern processing engine, a session processing engine and the like can be provided and embodied. Other engines can be newly added as needed, or some engines can be functionally omitted in an embodiment. Like this, a system provided with various types of engines can be appropriately embodied depending on a situation. Particularly, since such various types of engines are provided in plurality respectively, a large amount of packets can be processed.

As described above, packets are distributed and processed by individual engines and assembled in the original sequence. That is, a packet data sequence assembly step S034 is performed to sort the packet data in order of the distributed packet read sequence serial number after the packet data are distributed and individually processed by the plurality of engines.

Then, a post-processing packet data storing step S035 is performed. The packet data are assembled in order and stored in the database 26 after the packet data are distributed and processed by the plurality of engines.

Accordingly, packet data are distributed, processed, and assembled based on the distributed packet read sequence serial number, and thus a writing process is performed to output the packet data in the original state. Therefore, it is advantageous in that a large amount of packets can be processed at a high-speed while keeping the original data undamaged.

Finally, a data output step S04 is performed. The packet data stored in the database 26 and processed by the distributed packet application engine unit 30 are read, and the packet data are assembled by the distributed packet serial engine unit 40 in order of packet based on sequence data information of the distributed packet read sequence serial number. Then, the packet data is outputted through the write buffer 25 and the write port 23.

According to the distributed packet processing method for high-speed networks using the distributed packet processing system 20 for high-speed networks 10 of the present invention provided as described above, in processing a large amount of packet data transmitted between the client terminal 13 and the server 11, since a plurality of packet processing engines of one type processes the packet data, a large amount of packet data can be processed at a high-speed.

Describing the configuration of the system provided to achieve the above object, a server 11 is connected to a client terminal 13 through a network 12, and a distributed packet processing system 20 is connected between the network 12 and the server 11.

The distributed packet processing system 20 comprises a read port 22 for receiving input data; a write port 23 for outputting output data; a read buffer 24 connected to the read port 22, for buffering the input data; and a write buffer 25 connected to the write port 23, for buffering the output data, and the distributed packet processing system 20 performs read and write operations on the packet data.

In addition, there is provided a distributed packet application engine unit 30 for processing input data. Since a plurality of engines is provided for each of multiple processing steps, packet data are distributed and processed in the plurality of engines in each step.

A plurality of engines is provided in the distributed packet application engine unit 30 in order to process a large amount of packet data, and each of the engines respectively processes the packet data in parallel.

Figure 7:
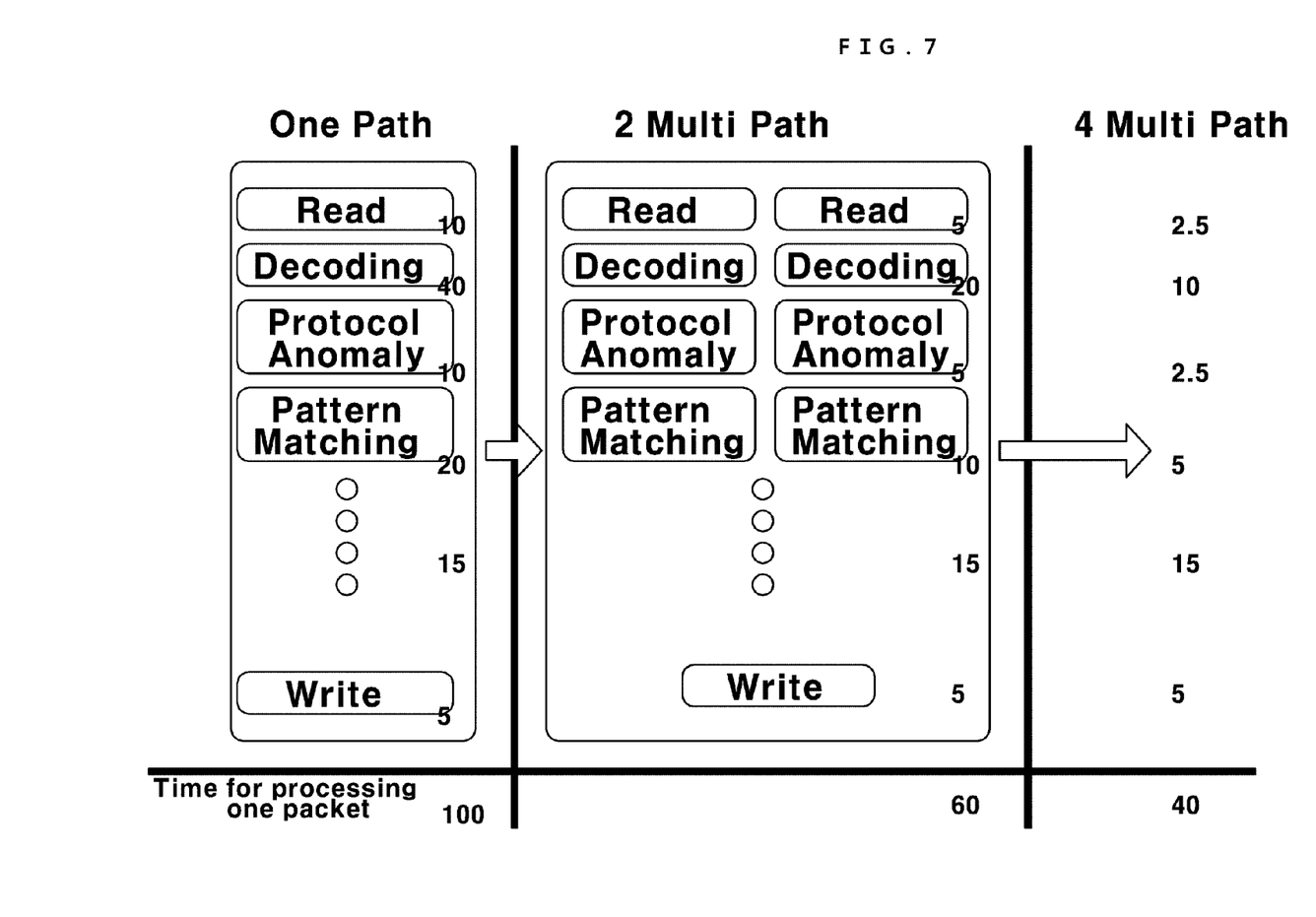
FIG. 7 is a view showing an example comparing the distributed packet processing system for high-speed networks according to embodiments of the present invention with a conventional technique.

Specifically, describing the types of engines that can be embodied, the distributed packet application engine unit 30 comprises a plurality of decoding engines 31 for decoding input data, as shown in FIGS. 7 to 9.

A plurality of protocol invalid check engines 32 for determining whether or not a protocol of input data is normal can be provided.

In addition, a plurality of TCP processing engines 33 for processing TCP of the input packet data can be provided.

In addition, a plurality of pattern processing engines 34 for determining whether or not a TCP protocol packet has an abnormal pattern can be provided.

Furthermore, a plurality of session processing engines 35 for processing a session for a normal TCP packet can be provided.

The packet data passes through the packet processing steps performed by a plurality of engines as described above.

In addition, there is provided a distributed packet serial engine unit 40 for assigning a distributed packet read sequence serial number to an input data.

The distributed packet serial engine unit 40 is provided in order to sequentially assign a distributed packet read sequence serial number to each input data. In addition, the distributed packet serial engine unit 40 compares the distributed packet read sequence serial number of the packet data (with those of the other packet data) under the control of the distributed packet processing controller 21 while the distributed packet application engine unit 30 processes the packet data, in order to assemble packet data being processed and packet data on which the packet process is completed based on the distributed packet read sequence serial numbers.

The distributed packet serial engine unit 40 transmits packet data assembled in order by comparing the distributed packet read sequence serial numbers of the packets on which packet processing is completed by the distributed packet application engine unit 30, to the distributed packet processing controller 21.

In addition, the distributed packet processing system 20 for high-speed networks 10 comprises a distributed packet processing controller 21 for controlling the read buffer 24, the write buffer 25, the distributed packet application engine unit 30, and the distributed packet serial engine unit 40. The distributed packet processing system 20 also comprises a database 26 for storing input data, output data, and serial information data on distributed packet read sequence serial numbers.

The distributed packet processing controller 21 comprises a read data signal processing unit 211 for receiving and processing input data, and a write data signal processing unit 212 for processing output data. In this manner, input data and output data are processed.

In addition, the distributed packet processing controller 21 comprises a serial data signal processing unit 213 for processing data transmitted and received to and from the distributed packet serial engine unit 40. As the distributed packet serial engine unit 40 transmits packet data on which the numbering process of assigning a distributed packet read sequence serial number to a packet data stored in the database 26 is completed by the distributed packet serial engine unit 40, the serial data signal processing unit 213 processes the transmitted packet data. The serial data signal processing unit 213 processes data transmitted and received in order to refer the distributed packet read sequence serial number of the packet data that is being processed, and data transmitted and received in order to assemble packet data based on the distributed packet read sequence serial number of each packet data when the packet processing is completed.

The distributed packet processing controller 21 comprises an AP engine data signal processing unit 214 for processing data transmitted and received to and from the distributed packet application engine unit 30 in order to process packets.

In processing the data transmitted and received to and from the distributed packet application engine unit 30, the AP engine data signal processing unit 214 transmits packet data for packet processing to the distributed packet application engine unit 30 and receives and processes data on which packet processing is completed.

The database 26 comprises an input data storage unit 261 for storing input data and an output data storage unit 262 for storing output data.

The database also comprises a serial data storage unit 263 for storing data information on a distributed packet read sequence serial number assigned to a packet data by the distributed packet serial engine unit 40, and an application data storage unit 264 for storing temporary packet data while the distributed packet application engine unit 30 processes the packet data.

That is, in the distributed packet processing method using the distributed packet processing system provided between the server 11 and the client terminal 13, a data input step S01 for receiving, buffering, and storing packet input data is performed, and a sequence serial number assigning step S02 for reading the packet data stored in the database 26, assigning a distributed packet read sequence serial number to the packet data in order of packet, and storing the packet data assigned with the distributed packet read sequence serial number in the database 26 is performed.

Then, a distributed packet processing step S03 for reading the packet data stored in the database 26 and assigned with the distributed packet read sequence serial number, distributing the packet data to a plurality of engines, processing the packet data in parallel, and storing the processed packet data in the database 26 is performed, and a data output step S04 for reading the packet data processed and stored in the database 26, assembling the packet data in order of packet based on the sequence of the distributed packet read sequence serial number, and outputting the assembled packet data is performed.

In the distributed packet processing step S03, a packet data reading step S031 for reading the packet data stored in the database 26 and assigned with the distributed packet read sequence serial number is performed, and a packet data sequential distribution step S032 for distributing the packet data to a plurality of engines depending on the sequence of the distributed packet read sequence serial number is performed.

In addition, a distributed multiple packet processing step S033 for processing the packet data distributed to a plurality of engines is performed. A packet data sequence assembly step S034 for assembling the packet data in order of the distributed packet read sequence serial number after the packet data are distributed to a plurality of engines and processed by individual engines is performed. A post-processing packet data storing step S035 for storing the packet data after the packet data are distributed and processed in parallel by the plurality of engines is performed.

According to the distributed packet processing system 20 for high-speed networks 10 of the present invention provided as described above, packet processing time is reduced when a large amount of high-speed packet data is processed between the client terminal 13 and the server, since packet data processed by individual packet processing engine are processed in parallel by a plurality of packet processing engines.

In processing packets for high-speed networks, the present invention configured as described above is greatly effective in that since a FIFO-type packet processing engine having three packet processing steps (packet read/packet analysis engine/packet write) is provided in plurality to process packet data in parallel, packet sequences are guaranteed, and packets can be further promptly processed.

Particularly, since a distributed packet read sequence serial number is assigned to each input packet data, the packet data can be processed in parallel by a plurality of engines, and the distributed packet data can be assembled and outputted based on the distributed packet read sequence serial numbers, and, therefore, the packet data are not damaged in the process of distributing and processing the packet data.

Furthermore, since packets can be processed in parallel when a packet processing step performed by one of a plurality of packet processing engines consumes a large packet processing time, the overall packet processing time is reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A distributed packet processing system for high-speed networks, wherein a server is connected to a client terminal through a network, and the distributed packet processing system is connected between the network and the server, the distributed packet processing system comprising:

a read port for receiving input data;

a write port for outputting output data;

a read buffer connected to the read port, for buffering the input data;

a write buffer connected to the write port, for buffering the output data;

a distributed packet application engine for processing input data, wherein a plurality of engines is provided for each of multiple processing steps and packet data are distributed and processed in the plurality of engines of each step;

a distributed packet serial engine for assigning a distributed packet read sequence serial number to the input data;

a distributed packet processing controller for controlling the read buffer, the write buffer, the distributed packet application engine, and the distributed packet serial engine; and a database for storing the input data, the output data, and serial information data on the distributed packet read sequence serial number, wherein the distributed packet serial engine sequentially assigns the distributed packet read sequence serial number to the input data, compares the distributed packet read sequence serial number of the packet data with those of the other packet data under a control of the distributed packet processing controller while the distributed packet application engine processes the packet data, and transmits data assembled in order by comparing the distributed packet read sequence serial numbers of packets on which packet processing is completed by the distributed packet application engine, to the distributed packet processing controller, and wherein the distributed packet processing controller comprises:

a read data signal processing unit for receiving and processing the input data;

a write data signal processing unit for processing the output data;

a serial data signal processing unit for processing data transmitted and received to and from the distributed packet serial engine;

an AP engine data signal processing unit for processing data transmitted and received to and from the distributed packet application engine in order to process packets; and a distributed packet main controller for controlling the read data signal processing unit, the write data signal processing unit, the serial data signal processing unit, and the AP engine data signal processing unit, and the database comprises:
- an input data storage for storing the input data;
- an output data storage for storing the output data;
- a serial data storage for storing data information on the distributed packet read sequence serial number assigned to the packet data by the distributed packet serial engine; and
- an application data storage for storing temporary packet data while the distributed packet application engine processes the packets.

2. A distributed packet processing method using a distributed packet processing system for high-speed networks, wherein a server is connected to a client terminal through a network, and the distributed packet processing system is connected between the network and the server, the method comprising:

- a data input step for buffering input data received through a read port in a read buffer and storing the buffered input data into a database;
- a sequence serial number assigning step for reading and transmitting the input data stored in the database to a distributed packet serial engine, assigning a distributed packet read sequence serial number to an input data packet in order of input by the distributed packet serial engine, and storing the packet data assigned with the distributed packet read sequence serial number in the database;
- a distributed packet processing step for reading and transmitting the packet data stored in the database and assigned with the distributed packet read sequence serial number to a distributed packet application engine, causing the distributed packet application engine to process the packet data, causing the distributed packet engine serial engine to compare the distributed packet read sequence serial number with those of the other packet data under a control of the distributed packet application engine while the distributed packet application engine processes the packet data, and storing packet data distributed to a plurality of engines in order of the distributed packet read sequence serial number and processed in parallel by the engines into the database; and
- a data output step for reading the packet data stored in the database and processed by the distributed packet application engine, assembling the packet data by the distributed packet serial engine in order of packet based on sequence data information of the distributed packet read sequence serial number, and outputting output data through a write buffer and a write port.

3. A distributed packet processing method for high-speed networks using a distributed packet processing system for high-speed networks provided between a server and a client terminal, the method comprising:

- a data input step for receiving, buffering, and storing packet input data;
- a sequence serial number assigning step for reading the packet data stored in a database, assigning a distributed packet read sequence serial number to the packet data in order of packet, and storing the packet data assigned with the distributed packet read sequence serial number in the database;
- a distributed packet processing step for reading the packet data stored in the database and assigned with the distributed packet read sequence serial number, distributing the packet data to a plurality of engines, processing the packet data in parallel, and storing the processed packet data in the database; and
- a data output step for reading the packet data processed and stored in the database, assembling the packet data in order of packet based on a sequence of the distributed packet read sequence serial number, and outputting the assembled packet data, and the distributed packet processing step comprises:
- a packet data reading step for reading the packet data stored in the database and assigned with the distributed packet read sequence serial number;
- a packet data sequential distribution step for distributing the packet data to the plurality of engines depending on the sequence of the distributed packet read sequence serial number;
- a distributed multiple packet processing step for processing the packet data distributed to the plurality of engines;
- a packet data sequence assembly step for comparing the distributed packet read sequence serial number of the packet data with those of the other packet data while the plurality of engines process the packet data and assembling the packet data in order of the distributed packet read sequence serial number after the packet data are distributed and individually processed by the plurality of engines; and
- a post-processing packet data storing step for storing the packet data after the packet data are distributed and processed in parallel by the plurality of engines.

* * * * *